United States Patent
Lin

(10) Patent No.: US 12,477,590 B2
(45) Date of Patent: Nov. 18, 2025

(54) USER EQUIPMENT, BASE STATION, AND INFORMATION TRANSMISSION METHOD

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 404 days.

(21) Appl. No.: 18/180,528

(22) Filed: Mar. 8, 2023

(65) Prior Publication Data

US 2023/0247683 A1  Aug. 3, 2023

Related U.S. Application Data

(63) Continuation of application No. PCT/IB2020/001150, filed on Nov. 3, 2020.

(30) Foreign Application Priority Data

Sep. 28, 2020  (WO) .................. PCT/IB2020/000798

(51) Int. Cl.
*H04W 74/08* (2024.01)
*H04W 74/0833* (2024.01)
*H04W 74/0836* (2024.01)
*H04W 74/0838* (2024.01)

(52) U.S. Cl.
CPC ... *H04W 74/0841* (2013.01); *H04W 74/0833* (2013.01); *H04W 74/0836* (2024.01); *H04W 74/0838* (2024.01)

(58) Field of Classification Search
CPC ......... H04W 74/0841; H04W 74/0833; H04W 74/0836; H04W 74/0838
See application file for complete search history.

(56) References Cited

U.S. PATENT DOCUMENTS

2019/0254073 A1* 8/2019 Sheng ................ H04W 74/006

OTHER PUBLICATIONS

Oppo ("NTN control procedure for physical layer", 3GPP Draft; R1-1910386, Mobile Competence Centre; 650, Route Des Lucioles; F-06921 Sophia-Antipolis Cedex, France; Oct. 2019) (Year: 2019).*
International Search Report (ISR) dated Jan. 17, 2022 for Application No. PCT/IB2020/001150.

(Continued)

*Primary Examiner* — Jamal Javaid
(74) *Attorney, Agent, or Firm* — Ladas & Parry LLP

(57) ABSTRACT

A user equipment (UE), a base station, and an information transmission method are provided. The information transmission method includes determining, by a user equipment (UE), a first time duration and/or a second time duration; and determining, by the UE, a first position using the first time duration and/or a second position using the second time duration for a random access procedure, wherein the first position comprises a position of a first window and the second position comprises a position of a first transmission. This can solve issues in the prior art, adapt a suitable offset value and/or duration for the subsequent transmission, provide a good communication performance, and/or provide high reliability.

16 Claims, 5 Drawing Sheets

(a) CBRA with 4-step RA type (b) CBRA with 2-step RA type (c) CFRA with 4-step RA type (d) CFRA with 2-step RA type

(56) References Cited

OTHER PUBLICATIONS

Written Opinion (WOSA) dated Jan. 17, 2022 for Application No. PCT/IB2020/001150.
International Search Report (ISR) dated Jul. 9, 2021 for Application No. PCT/IB2020/000798.
Written Opinion (WOSA) dated Jul. 9, 2021 for Application No. PCT/IB2020/000798.
Oppo,NTN control procedure for physical layer, RI-1910386, 3GPP TSG RAN WG1 #98bis,Chongqing, China, Oct. 14-20, 2019.
Huawei, HiSilicon ,Discussion on timing relationship enhancements for NTN,RI-2005265,3GPP TSG RAN WGI Meeting #102-e,E-meeting, Aug. 17-28, 2020.
ETRI,MAC enhancements on the initial access procedures for NTN,R2-2007995,3GPP TSG-RAN WG2 Meeting #111 electronic,Online, Aug. 17-28, 2020.
3GPP TR 38.821 V16.0.0 (Dec. 2019);3rd Generation Partnership Project;Technical Specification Group Radio Access Network;Solutions for NR to support non-terrestrial networks (NTN)(Release 16).
The first Office Action of corresponding European application No. 20928054.4, dated Mar. 17, 2025.

* cited by examiner

USER EQUIPMENT, BASE STATION, AND INFORMATION TRANSMISSION METHOD

CROSS-REFERENCE TO RELATED APPLICATION

This application is a continuation of International Application No. PCT/BI2020/001150, filed on Nov. 3, 2020, which claims the priority of International Application No. PCT/IB2020/000798, filed on Sep. 28, 2020. The contents of the two applications are hereby incorporated by reference in their entireties.

TECHNICAL FIELD

The present disclosure relates to the field of communication systems, and more particularly, to a user equipment, a base station, and an information transmission method, which can provide a good communication performance and/or high reliability.

BACKGROUND

Non-terrestrial networks (NTNs) refer to networks, or segments of networks, using a spaceborne vehicle or an airborne vehicle for transmission. Spaceborne vehicles include satellites including low earth orbiting (LEO) satellites, medium earth orbiting (MEO) satellites, geostationary earth orbiting (GEO) satellites, and highly elliptical orbiting (HEO) satellites. Airborne vehicles include high altitude platforms (HAPs) encompassing unmanned aircraft systems (UAS) including lighter than air (LTA) unmanned aerial systems (UAS) and heavier than air (HTA) UAS, all operating in altitudes typically between 8 and 50 km, quasi-stationary.

Communication via a satellite is an interesting means thanks to its well-known coverage, which can bring the coverage to locations that normally cellular operators are not willing to deploy either due to non-stable crowd potential client, e.g. extreme rural, or due to high deployment cost, e.g. middle of ocean or mountain peak. Nowadays, the satellite communication is a separate technology to a 3rd generation partnership project (3GPP) cellular technology. Coming to the fifth-generation mobile communication technology (5G) era, these two technologies can merge together, i.e. we can imagine having a 5G terminal that can access to a cellular network and a satellite network. The NTN can be good candidate technology for this purpose. It is to be designed based on 3GPP new radio (NR) with necessary enhancement.

In NTN, due to very high satellite altitude, a round trip time (RTT) between a sender (satellite/user equipment (UE)) and a receiver (UE/satellite) is extremely long. The communications shall need to take this long RTT into account for data transmission. Further, in NTN, due to the very long round trip time between the satellite and the user equipment, the transmission throughput is limited.

Communication over unlicensed spectrum: In an unlicensed band, an unlicensed spectrum is a shared spectrum. Communication equipment in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability. LBT is also called channel access procedure. UE performs channel access procedure before the transmission, if the channel access procedure is successful, i.e. the channel is sensed to be idle, the UE starts to perform the transmission. If the channel access procedure is not successful, i.e. the channel is sensed to be not idle, the UE cannot perform the transmission.

In the latest new radio unlicensed (NRU) system, if the NRU system is configured to be semi-static channel access mode, the UE cannot initiate a maximum channel occupancy time (MCOT), and the UE has to detect a downlink signal before being allowed to transmit any uplink transmission. This will greatly limit a UE performance, and notably increasing transmission latency. To envision any latency stringent service, e.g. factory machine type communications or high quality surveillance, the latency needs to be reduced.

In NTN, due to very high satellite altitude, a round trip time (RTT) between a sender (satellite/user equipment (UE)) and a receiver (UE/satellite) is extremely long. The communications shall need to take this long RTT into account for data transmission. An offset, which is used to absorb the long RTT, is used for determining an uplink transmission. But in random access channel (RACH) procedure, idle UE and connected UE might access to a same RACH occasion (RO), moreover a base station may not have prior knowledge about which one who attempts to transmit PRACH in a given RO, therefore the base station might not be able to adapt a suitable offset value for the subsequent PUSCH transmission.

Therefore, there is a need for a user equipment, a base station, and an information transmission method, which can solve issues in the prior art, adapt a suitable offset value and/or duration for the subsequent transmission, provide a good communication performance, and/or provide high reliability.

SUMMARY

An object of the present disclosure is to propose a user equipment, a base station, and an information transmission method, which can solve issues in the prior art, adapt a suitable offset value and/or duration for the subsequent transmission, provide a good communication performance, and/or provide high reliability.

In a first aspect of the present disclosure, an information transmission method comprises determining, by a user equipment (UE), a first time duration and/or a second time duration; and determining, by the UE, a first position using the first time duration and/or a second position using the second time duration for a random access procedure, wherein the first position comprises a position of a first window and the second position comprises a position of a first transmission.

In a second aspect of the present disclosure, an information transmission method comprises configuring, by a base station, a first time duration and/or a second time duration to a user equipment (UE); and controlling, by the base station, the UE to determine a first position using the first time duration and/or a second position using the second time duration for a random access procedure, wherein the first position comprises a position of a first window and the second position comprises a position of a first transmission.

In a third aspect of the present disclosure, a user equipment comprises a memory, a transceiver, and a processor coupled to the memory and the transceiver. The processor is configured to determine a first time duration and/or a second time duration and determine a first position using the first time duration and/or a second position using the second time duration for a random access procedure, wherein the first position comprises a position of a first window and the second position comprises a position of a first transmission.

In a fourth aspect of the present disclosure, a base station comprises a memory, a transceiver, and a processor coupled to the memory and the transceiver. The processor is configured to: configure a first time duration and/or a second time duration to a user equipment (UE) and control the UE to determine a first position using the first time duration and/or a second position using the second time duration for a random access procedure, wherein the first position comprises a position of a first window and the second position comprises a position of a first transmission.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DESCRIPTION OF EMBODIMENTS

Figure 1:
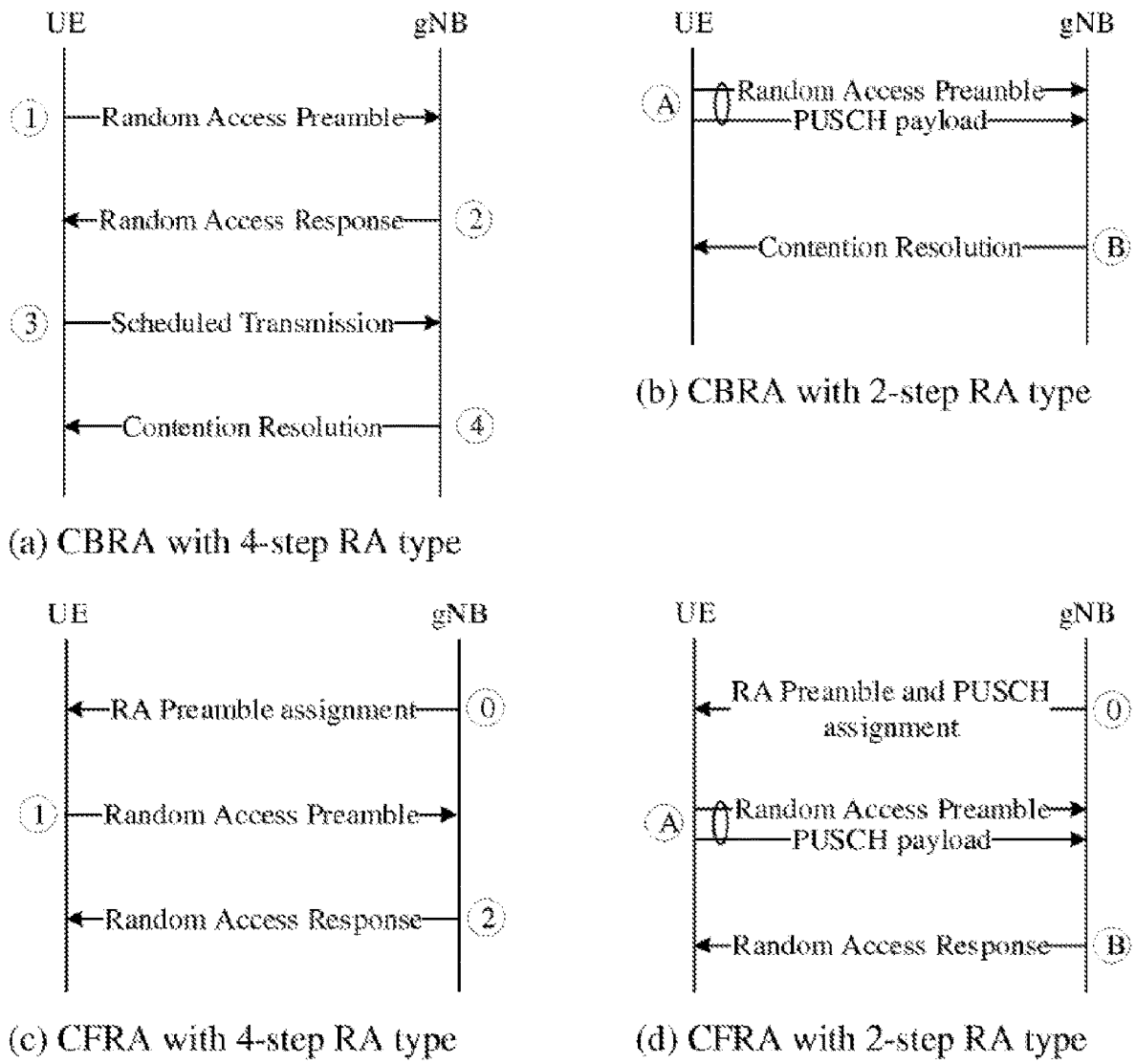
FIG. 1 is a schematic diagram illustrating random access procedures according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In NTN, due to very high satellite altitude, a round trip time (RTT) between a sender (satellite/user equipment (UE)) and a receiver (UE/satellite) is extremely long. The communications shall need to take this long RTT into account for data transmission. An offset, which is used to absorb the long RTT, is used for determining an uplink transmission. But in a physical random access channel (PRACH) procedure, idle UE and connected UE might access to a same RACH occasion (RO), moreover a base station may not have prior knowledge about which one who attempts to transmit PRACH in a given RO, therefore the base station might not be able to adapt a suitable offset value for the subsequent PUSCH transmission. In some embodiments of the present disclosure, several methods and/or technical solutions are provided to address this ambiguity and/or issue.

As used herein, a connected UE refers to a UE in a connected state, while an idle UE refers to a UE in an idle state. That is, a connected UE means a set of serving UE in a cell of a base station, and an idle UE means a UE this has registered with a network but has no non access stratum (NAS) (i.e., core network) connection(s).

A random access procedure is triggered by a number of events: Initial access from RRC_IDLE; radio resource control (RRC) Connection Re-establishment procedure; DL or UL data arrival during RRC_CONNECTED when UL synchronisation status is "non-synchronised"; UL data arrival during RRC_CONNECTED when there are no physical uplink control channel (PUCCH) resources for SR available; SR failure; Request by RRC upon synchronous reconfiguration (e.g. handover); Transition from RRC_INACTIVE; To establish time alignment for a secondary TAG; Request for Other system information (SI); Beam failure recovery; or Consistent UL LBT failure on SpCell.

Two types of random access procedure are supported: 4-step RA type with MSG1 and 2-step RA type with MSGA. Both types of RA procedure support contention-based random access (CBRA) and contention-free random access (CFRA) as illustrated on FIG. 1 below. The UE selects the type of random access at initiation of the random access procedure based on network configuration: When CFRA resources are not configured, an reference signal received power (RSRP) threshold is used by the UE to select between 2-step RA type and 4-step RA type; when CFRA resources for 4-step RA type are configured, UE performs random access with 4-step RA type; and/or or when CFRA resources for 2-step RA type are configured, UE performs random access with 2-step RA type. The network does not configure CFRA resources for 4-step and 2-step RA types at the same time for a Bandwidth Part (BWP). CFRA with 2-step RA type is only supported for handover.

The MSG1 of the 4-step RA type consists of a preamble on PRACH. After MSG1 transmission, the UE monitors for a response from the network within a configured window. For CFRA, dedicated preamble for MSG1 transmission is assigned by the network and upon receiving random access response from the network, the UE ends the random access procedure as illustrated in FIG. 1(c). For CBRA, upon reception of the random access response, the UE sends MSG3 using the UL grant scheduled in the response and monitors contention resolution as illustrated in FIG. 1(a). If contention resolution is not successful after MSG3 (re)transmission(s), the UE goes back to MSG1 transmission.

The MSGA of the 2-step RA type includes a preamble on PRACH and a payload on PUSCH. After MSGA transmission, the UE monitors for a response from the network within a configured window. For CFRA, dedicated preamble and PUSCH resource are configured for MSGA transmission and upon receiving the network response, the UE ends the random access procedure as illustrated in FIG. 1(d). For CBRA, if contention resolution is successful upon receiving the network response, the UE ends the random access procedure illustrated in FIG. 1(b); while if fallback indication is received in MSGB, the UE performs MSG3 transmission using the UL grant scheduled in the fallback indication and monitors contention resolution as illustrated in FIG. 1. If contention resolution is not successful after MSG3 (re)transmission(s), the UE goes back to MSGA transmission. If the random access procedure with 2-step RA type is not completed after a number of MSGA transmissions, the UE can be configured to switch to CBRA with 4-step RA type.

For random access in a cell configured with supplementary uplink (SUL), the network can explicitly signal which carrier to use (UL or SUL). Otherwise, the UE selects the SUL carrier if and only if the measured quality of the DL is lower than a broadcast threshold. UE performs carrier selection before selecting between 2-step and 4-step RA type. The RSRP threshold for selecting between 2-step and 4-step RA type can be configured separately for UL and SUL. Once started, all uplink transmissions of the random access procedure remain on the selected carrier.

When CA is configured, random access procedure with 2-step RA type is only performed on primary cell (PCell) while contention resolution can be cross-scheduled by the PCell. When CA is configured, for random access procedure with 4-step RA type, the first three steps of CBRA always occur on the PCell while contention resolution (step 4) can be cross-scheduled by the PCell. The three steps of a CFRA started on the PCell remain on the PCell. CFRA on SCell can only be initiated by the gNB to establish timing advance for a secondary TAG: the procedure is initiated by the gNB with a PDCCH order (step 0) that is sent on a scheduling cell of an activated SCell of the secondary TAG, preamble transmission (step 1) takes place on the indicated SCell, and Random Access Response (step 2) takes place on PCell.

Figure 2:
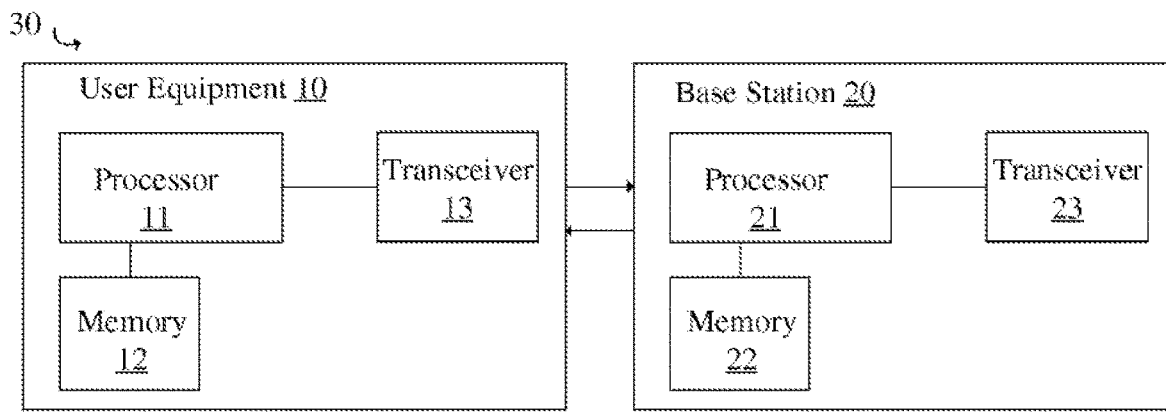
FIG. 2 is a block diagram of one or more user equipment (UE) and a base station (e.g., a next generation NodeB (gNB)) of communication in a communication network system (e.g., non-terrestrial network (NTN) or a terrestrial network) according to an embodiment of the present disclosure.

FIG. 2 illustrates that, in some embodiments, one or more user equipment (UE) 10 and a base station (e.g., gNB) 20 for communication in a communication network system 30 (e.g., non-terrestrial network (NTN) or terrestrial network) according to an embodiment of the present disclosure are provided. The communication network system 30 includes the one or more UE 10 and the base station 20. The one or more UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the communication between the UE 10 and the BS 20 comprises non-terrestrial network (NTN) communication. In some embodiments, the base station 20 comprises spaceborne platform or airborne platform or high altitude platform station.

In some embodiments, the processor 11 is configured to determine a first time duration and/or a second time duration and determine a first position using the first time duration and/or a second position using the second time duration for a random access procedure, wherein the first position comprises a position of a first window and the second position comprises a position of a first transmission. This can solve issues in the prior art, adapt a suitable offset value and/or duration for the subsequent transmission, provide a good communication performance, and/or provide high reliability.

In some embodiments, the processor 21 is configured to: configure a first time duration and/or a second time duration to the user equipment (UE) 10 and control the UE 10 to determine a first position using the first time duration and/or a second position using the second time duration for a random access procedure, wherein the first position comprises a position of a first window and the second position comprises a position of a first transmission. This can solve issues in the prior art, adapt a suitable offset value and/or duration for the subsequent transmission, provide a good communication performance, and/or provide high reliability.

Figure 3:
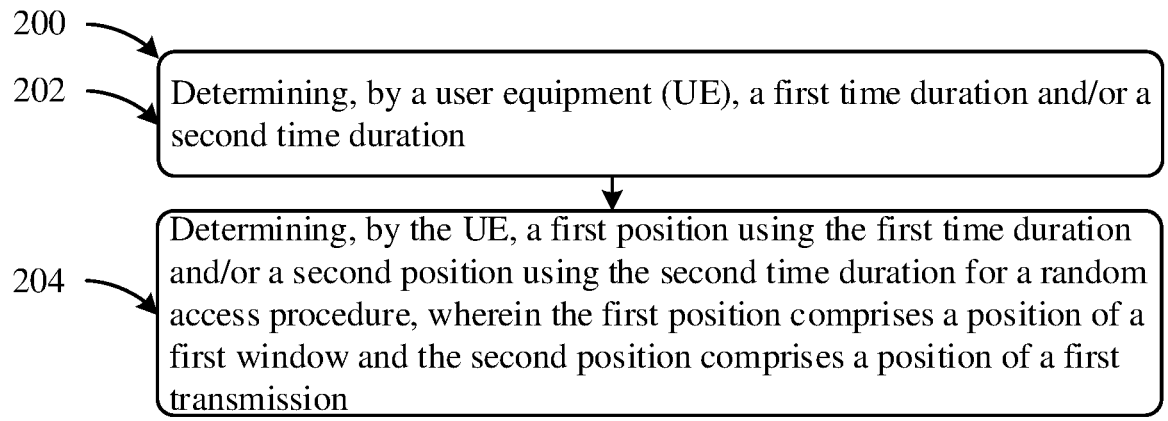
FIG. 3 is a flowchart illustrating an information transmission method performed by a user equipment (UE) according to an embodiment of the present disclosure.

FIG. 3 illustrates an information transmission method 200 performed by a UE according to an embodiment of the present disclosure. In some embodiments, the method 200 includes: a block 202, determining, by a user equipment (UE), a first time duration and/or a second time duration; and a block 204, determining, by the UE, a first position using the first time duration and/or a second position using the second time duration for a random access procedure, wherein the first position comprises a position of a first window and the second position comprises a position of a first transmission. This can solve issues in the prior art, adapt a suitable offset value and/or duration for the subsequent transmission, provide a good communication performance, and/or provide high reliability.

Figure 4:
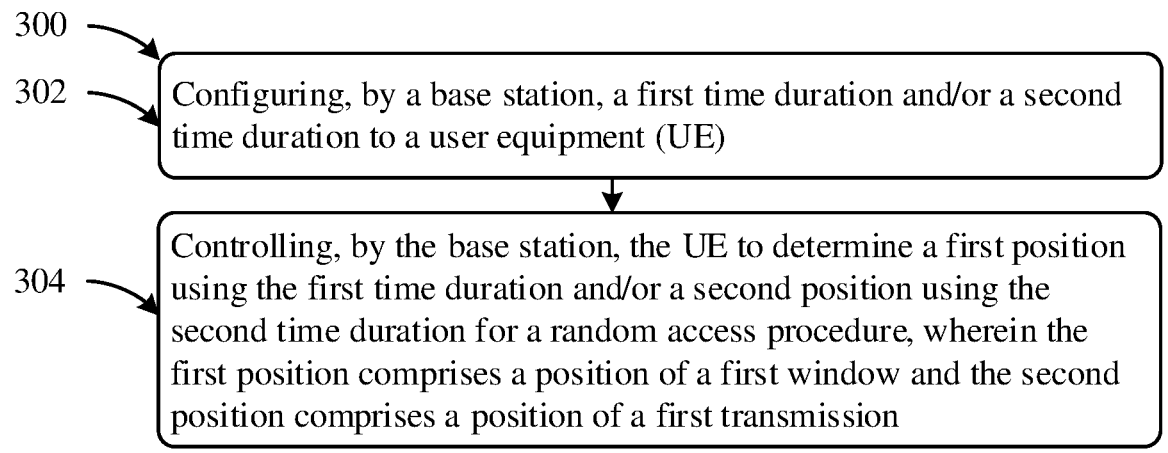
FIG. 4 is a flowchart illustrating an information transmission method performed by a base station according to an embodiment of the present disclosure.

FIG. 4 illustrates an information transmission method 300 performed by a base station according to an embodiment of the present disclosure. In some embodiments, the method 300 includes: a block 302, configuring, by a base station, a first time duration and/or a second time duration to a user equipment (UE); and a block 304, controlling, by the base station, the UE to determine a first position using the first time duration and/or a second position using the second time duration for a random access procedure, wherein the first position comprises a position of a first window and the second position comprises a position of a first transmission. This can solve issues in the prior art, adapt a suitable offset value and/or duration for the subsequent transmission, provide a good communication performance, and/or provide high reliability.

In some embodiments, the random access procedure comprises at least one of the followings: a type 1 random access procedure, or a type 2 random access procedure. In some embodiments, the type 1 random access procedure comprises a 4-step resource allocation (RA) type. In some embodiments, the type 2 random access procedure comprises a 2-step RA type. In some embodiments, the 4-step RA type comprises the UE transmitting a message 1 (Msg1) on a physical random access channel (PRACH) transmission, wherein the Msg1 comprises a preamble. In some embodiments, the 2-step RA type comprises the UE transmitting a message A (MsgA) on the PRACH transmission and a first physical uplink shared channel (PUSCH) transmission, wherein the Msg A comprises a preamble and a payload. In some embodiments, the preamble is transmitted in the PRACH transmission. In some embodiments, the payload is transmitted in the first PUSCH transmission. In some embodiments, the first PUSCH is associated with the PRACH transmission. In some embodiments, the random access procedure comprises a contention-based random access procedure (CBRA) and/or a contention-free random access procedure (CFRA).

In some embodiments, the CFRA comprises a preamble assigned by a base station and/or a resource of the first PUSCH assigned by the base station. In some embodiments, the first window comprises a random access response (RAR) window and/or a contention resolution window. In some embodiments, the RAR window comprises a window for receiving a RAR to the Msg 1 and/or a RAR to the MsgA, by the UE, from the base station. In some embodiments, the RAR is transmitted in a first physical downlink shared channel (PDSCH) or in a first physical downlink control channel (PDCCH), wherein the first PDSCH is scheduled by a first downlink control information (DCI) format with cyclical redundancy check (CRC) scrambled by random access-radio network temporary identity (RA-RNTI) or MsgA-radio network temporary identity (MsgA-RNTI). In some embodiments, the first DCI format comprises DCI format 1_0. In some embodiments, the contention resolution window comprises a timer. In some embodiments, the UE may receive a second PDSCH within the contention resolution window, wherein the second PDSCH may be in response to the first PUSCH and/or a second PUSCH. In some embodiments, the second PUSCH may be scheduled by a RAR uplink grant and/or a second DCI format with CRC scrambled by temporary cell-radio network temporary identity (temporary cell-RNTI, TC-RNTI).

In some embodiments, the second PUSCH comprises a message 3 (Msg3). In some embodiments, the RAR uplink grant may be transmitted in the first PDSCH. In some embodiments, the second DCI format comprises DCI format 0_0. In some embodiments, the first DCI format and/or the second DCI format may be detected in a second PDCCH according to a type 1 PDCCH common search space (CSS) set. In some embodiments, the second PDSCH comprises a UE contention resolution identity. In some embodiments, the first PDCCH comprises a third DCI format with CRC scrambled by C-RNTI or modulation coding scheme (MCS)-cell-RNTI (MCS-C-RNTI). In some embodiments, the first PDCCH is detected in a configured search space set. In some embodiments, the configured search space set is configured by recoverySearchSpaceId. In some embodiments, the first window comprises a starting location and a window duration. In some embodiments, the window duration is pre-defined or configured by the base station or signaled by the UE. In some embodiments, determining the first position comprises at least determining the starting location of the first window and/or the window duration. In some embodiments, determining the second position comprises at least determining a time domain resource for the first transmission. In some embodiments, the second PDSCH comprises a responding message to the Msg3 and/or the MsgA.

In some embodiments, the time domain resource comprises at least one of the followings: one or more slots in which the first transmission is transmitted; or one or more symbols in the one or more slots for the first transmission. In some embodiments, the starting location of the first window is relevant to the first time duration and/or a first symbol, wherein the first symbol is relevant to the PRACH transmission and/or the first PUSCH and/or the second PUSCH. In some embodiments, the first symbol comprises a last symbol of the PRACH transmission and/or a last symbol of the first PUSCH transmission and/or a last symbol of the second PUSCH transmission. In some embodiments, the starting location of the first window is further relevant to a second symbol, wherein the second symbol is a symbol of an earliest control resource set (CORESET). In some embodiments, the CORESET is for reception of the first PDCCH and/or the second PDCCH. In some embodiments, the second symbol is an earliest symbol of the CORESET.

In some embodiments, the second symbol is later than the first symbol by at least the first time duration.

In some embodiments, the starting location of the first window is the second symbol. In some embodiments, the time domain resource is determined according to the second time duration and/or a first slot, wherein the UE receives the first PDSCH and/or the second PDSCH and/or the second DCI format and/or the first PDCCH and/or the second PDCCH in the first slot. In some embodiments, the first transmission comprises at least one of the followings: the first PUSCH, the second PUSCH, a third PUSCH, the PRACH transmission, a sounding reference signal (SRS), or a PUCCH, wherein the third PUSCH and/or the SRS may be scheduled by the third DCI format. In some embodiments, the PUCCH at least comprises a hybrid automatic repeat request acknowledgement (HARQ-ACK) information corresponding to the second PDSCH. In some embodiments, the first time duration and/or the second time duration comprises a unit of millisecond (ms), second, minute, symbol, or slot. In some embodiments, determining the first time duration and/or the second time duration comprises determining the first time duration and/or the second time duration from a pre-defined value, and/or from a first parameter, and/or from a timing advance.

In some embodiments, the first parameter may be configured by the base station and/or signaled by the UE. In some embodiments, the first parameter may be configured by the base station in at least one of the followings: a system information, the RAR, a UE dedicated RRC message, a medium access control-control element (MAC-CE), a DCI. In some embodiments, the first parameter may be signaled by the UE in at least one of the followings: the Msg1, the MsgA, the Msg3, an RRC message in a PUSCH, a MAC-CE in a PUSCH, or an uplink control information (UCI). In some embodiments, determining the first time duration and/or the second time duration is further relevant to the CFRA and/or the CBRA and/or the 2-step RA type and/or the 4-step RA type and/or an active BWP. In some embodiments, the UE determines the first time duration and/or the second time according to whether the random process procedure is the CFRA or the CBRA. In some embodiments, the UE determines the first time duration and/or the second time according to whether the random process procedure is the 2-step RA type or the 4-step RA type. In some embodiments, the UE determines the first time duration and/or the second time according to a relationship between an active BWP and an initial UL BWP.

In some embodiments, the active BWP comprises an active UL BWP in which the UE transmits the PRACH transmission for the random access procedure. In some embodiments, when the random access procedure is at least one of the followings: the CFRA, the CBRA, the 2-step RA type, or the 4-step RA type, the UE may determine the first time duration and/or the second time duration from the system information by the first parameter. In some embodiments, when the active BWP satisfies at least one of the following conditions: the active BWP includes all the resource blocks (RBs) of the initial UL BWP; or the active BWP has the same subcarrier spacing as the initial UL BWP; or the active BWP has the same cyclic prefix (CP) length as the initial UL BWP; or the UE may determine the first time duration and/or the second time duration from the system information by the first parameter. In some embodiments, the first parameter may be configured in a first system information block (SIB1) and/or a SIBx, where x is an integer and greater than 1.

In some embodiments, the first parameter comprises one or more values, wherein the one or more values correspond to one or more BWPs and/or one or more frequencies and/or one or more reference signal indexes. In some embodiments, a value among the one or more values of the first parameter is associated with at least a BWP among the one or more BWPs. In some embodiments, the UE obtains an information relevant to an association between the one or more values of the first parameter and the one or more BWPs from at least one of the followings: the system information, an RRC message, a MAC-CE, or a DCI. In some embodiments, the RRC message comprises at least UE-specific RRC message. In some embodiments, the DCI comprises at least UE-specific DCI format and/or group-common DCI format, wherein the UE-specific DCI format is CRC scrambled by cell-radio network temporary identity (C-RNTI) or coding scheme-RNTI (CS-RNTI) or MCS-C-RNTI. In some embodiments, the group common DCI format is detected in a PDCCH according to a type-3 PDCCH common search space (CSS) set. In some embodiments, the reference signal index comprises a synchronization signal block (SSB) index and/or a channel state information-reference signal (CSI-RS) resource index. In some embodiments, the UE determines the first time duration and/or the second time duration from the first parameter further comprising determining a value from the one or more values, wherein the determined value may correspond to the active BWP and/or a frequency for the random access procedure and/or a reference signal index associated with one or more RACH occasions. In some embodiments, the UE transmits the PRACH transmission for the random access in at least one RACH occasion of the one or more RACH occasions. In some embodiments, the one or more BWPs may be configured with the one or more RACH occasions and the UE selects a target BWP for performing the random access procedure. In some embodiments, the UE determines a value of the first parameter corresponding to the target BWP.

In some embodiments, the first time duration may be determined from the second time duration or the second time duration may be determined from the first time duration. In some embodiments, the first time duration and the second time duration are equal. In some embodiments, the first time duration may be the second time duration plus a delta value or the second time duration may be the first time duration plus the delta value. In some embodiments, the delta value comprises a positive value and/or a negative value and/or a zero. In some embodiments, the delta value is configured in at least one of the followings: the RAR, the first PDSCH, the second PDSCH, the second DCI format, the first PDCCH, the second PDCCH.

In some embodiments, the first parameter comprises a first value and a second value, the first value and/or the second value are indicated by the base station in a system information. In some embodiments, the first value and the second value are in the same system information. In some embodiments, the first value and the second value are obtained from the first system information block (SIB1). In some embodiments, the first value and the second value are in different system information. In some embodiments, the first value is obtained from the SIB 1 and the second value is obtained from the SIBx. In some embodiments, the SIBx comprises a SIB9. In some embodiments, the first value is determined from the second value. In some embodiments, the first value is equal to the second value plus a delta. In some embodiments, the delta comprises an offset adjustment on the second value. In some embodiments, when the second value is equal to 10 slots and a value of the delta is equal to 5 slots, the first value is equal to 15 slots. In some embodiments, the value of the delta is indicated by the base station in the system information. In some embodiments, the value of the delta is positive or negative, and a unit of the delta is in second or millisecond or slot.

In some embodiments, the UE receives a PDSCH from the base station, and the PDSCH carries a MAC-CE. In some embodiments, the UE determines a MAC-CE activation time from a first slot that is after $n+3N_{slot}^{subframe,u}$, where n is a slot in which the UE transmits HARQ-ACK information corresponding to the PDSCH carrying the MAC-CE; u is PUCCH subcarrier spacing and $N_{slot}^{subframe,u}$, is a number of slots equivalent to 3 ms and n. In some embodiments, the MAC-CE activation time comprises a reference time that the MAC-CE command is applied. In some embodiments, the UE determines the MAC-CE activation time from the first slot that is after n' and an offset and $3N_{slot}^{subframe,u}$, where n' is a slot where a PUCCH resource is allocated for HARQ-ACK transmission for the PDSCH and n' is determined in UE downlink timing, and the offset is a number of slots. In some embodiments, a slot duration is based on a PUCCH subcarrier spacing. In some embodiments, the slot duration is based on a reference subcarrier spacing. In some embodiments, the reference subcarrier spacing is pre-defined or configured. In some embodiments, the offset is indicated in the MAC-CE. In some embodiments, a format of the MAC-CE comprises a field to indicate a value of the offset. In some embodiments, the value of the offset comprises zero. In some embodiments, the format of the MAC-CE format comprises or does not comprises the field to indicate the offset according to whether the MAC-CE relevant to UE reception or UE transmission. In some embodiments, the MAC-CE relevant to UE reception comprises at least one of the followings: activation/deactivation of a semi-persistent CSI-RS/channel state information-instant message (CSI-IM) resource set; an aperiodic CSI trigger state sub-selection; activation/deactivation of a UE-specific PDSCH terminal control interface (TCI) state; an indication of a TCI state of UE-specific PDCCH; or activation/deactivation of a semi-persistent ZP CSI-RS resource set. In some embodiments, the MAC-CE relevant to UE transmission comprises at least one of the followings: activation/deactivation of a semi-persistent SRS; or activation/deactivation of a spatial relation of a PUCCH resource. In some embodiments, when the MAC-CE is relevant to UE reception, the MAC-CE comprises an offset indication. In some embodiments, when the MAC-CE is relevant to UE transmission, the MAC-CE comprises an offset indication. In some embodiments, when the UE receives the PDSCH carrying a MAC-CE command, the UE determines MAC-CE activation time starts from a first slot that is after n' and N and an offset, where n' is a slot where the PUCCH resource is allocated for HARQ-ACK transmission for the PDSCH at the UE downlink timing and N is equal to $3N_{slot}^{subframe,u}$, and the offset is an indicated offset value. In some embodiments, the MAC-CE activation time is derived by the UE in the UE downlink timing. In some embodiments, the MAC-CE activation time is derived by the UE in the UE uplink timing. In some embodiments, the MAC-CE activation time is the first slot that is after n' and N and the offset and a timing advance, where n' is the slot in which UE transmits HARQ-ACK information for the PDSCH at the UE uplink timing. In some embodiments, the offset comprises the timing advance. In some embodiments, the timing advance comprises n' and N and a second offset. In some embodiments, the second offset comprises the offset and the timing advance. In some embodiments, the second offset is indicated by the base station. In some embodiments, the offset and/or the second offset is used for determining the MAC-CE activation time when the MAC-CE is relevant to UE reception. In some embodiments, the offset and/or the second offset is not used for determining the MAC-CE activation time when the MAC-CE is relevant to UE reception. In some embodiments, the offset and/or the second offset is used for determining the MAC-CE activation time when the MAC-CE is relevant to UE transmission. In some embodiments, the offset and/or the second offset is not used for determining the MAC-CE activation time when the MAC-CE is relevant to UE transmission.

Figure 5:
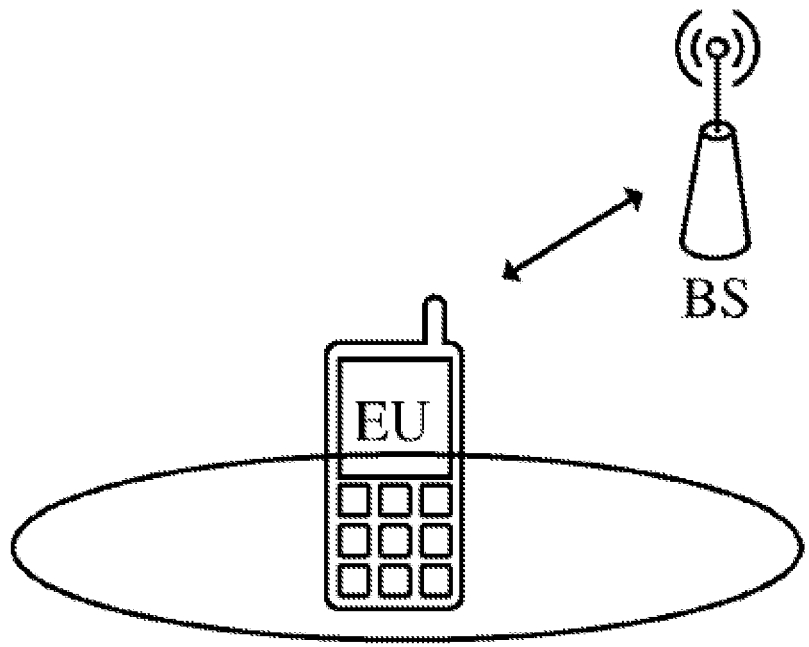
FIG. 5 is a schematic diagram illustrating a communication system including a base station (BS) and a UE according to an embodiment of the present disclosure.

FIG. 5 illustrates a communication system including a base station (BS) and a UE according to another embodiment of the present disclosure. In an embodiment, the communication system may include more than one base stations, and each of the base stations may connect to one or more UE. In this disclosure, there is no limit. As an example, the base station illustrated in FIG. 2 may be a moving base station, e.g. spaceborne vehicle (satellite) or airborne vehicle (drone). The UE can transmit transmissions to the base station and the UE can also receive the transmission from the base station. In an embodiment, not shown in FIG. 5, the moving base station can also serve as a relay which relays the received transmission from the UE to a ground base station or vice versa.

Spaceborne platform includes satellite and the satellite includes LEO satellite, MEO satellite and GEO satellite. While the satellite is moving, the LEO and MEO satellite is moving with regards to a given location on earth. However, for GEO satellite, the GEO satellite is relatively static with regards to a given location on earth. A spaceborne or airborne base station (BS), e.g. in particular for LEO satellite or drone, communicates with a user equipment (UE) on the ground. The round trip time (RTT) between them is time varying due to the mobility of the base station. The RTT variation is related to the distance variation between the BS and the UE. The RTT variation rate is proportional to the BS motion velocity. To ensure a good uplink synchronization, the BS will adjust the uplink transmission timing and/or frequency for the UE.

Figure 6:
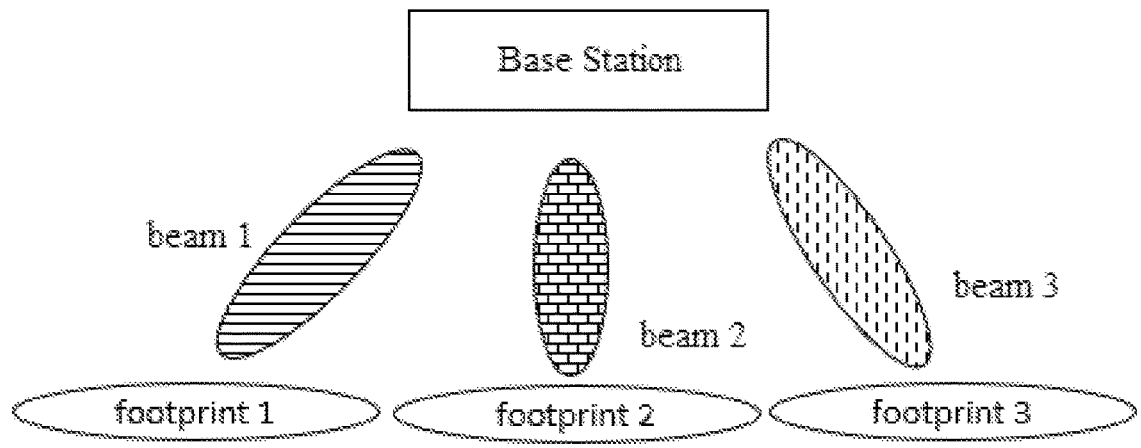
FIG. 6 is a schematic diagram illustrating that a BS transmits 3 beams to the ground forming 3 footprints according to an embodiment of the present disclosure.

In an embodiment, as illustrated in FIG. 6, where a base station is integrated in a satellite or a drone, and the base station transmits one or more beams to the ground forming one or more coverage areas called footprint. In FIG. 6, an example illustrates that the BS transmits three beams (beam 1, beam 2 and beam3) to form three footprints (footprint 1, 2 and 3), respectively. In an embodiment, 3 beams are transmitted at 3 different frequencies. In this example, the bit position is associated with a beam. FIG. 6 illustrates that, in some embodiments, a moving base station, e.g. in particular for LEO satellite or drone, communicates with a user equipment (UE) on the ground. Due to long distance between the UE and the base station on satellite the beamformed transmission is needed to extend the coverage. As illustrated in FIG. 6, where a base station is transmitting three beams to the earth forming three coverage areas called footpoints. Moreover, each beam may be transmitted at dedicated frequencies so that the beams for footprint 1, 2 and 3 are non-overlapped in a frequency domain.

K Offset Application:

In an NTN system, a UE tries to access to a network. The network may indicate a value of a time interval called K offset. The K offset may be used to determine a time domain resource allocation for an uplink transmission. The uplink transmission comprises at least one of the followings: a PUSCH transmission, a PUCCH transmission, a PRACH transmission or an SRS transmission. The principle of using K offset is to leave enough time to absorb the signal propagation delay, which is considered to be much longer compared to terrestrial network. The value of the indicated K offset can be in the unit of absolute time, e.g. millisecond or second or minutes, or can be in the unit of symbol or slot, where the duration of the symbol or the slot depends on the corresponding subcarrier spacing. The value is obtained to convert to the symbol or the slot with regards to the subcarrier spacing One example is given in Table 1. And the UE will determine the K offset in terms of a number of slots or symbols, based on the indicated value and/or the subcarrier spacing.

TABLE 1

| Subcarrier spacing | Slot duration (millisecond, ms) |
| --- | --- |
| 15 KHz | 1 ms |
| 30 KHz | 0.5 ms |
| 60 KHz | 0.25 ms |
| 120 KHz | 0.125 ms |
| 240 KHz | 0.0625 ms |

The value of the K offset may be indicated in a system information, e.g. SIB1 or SIBx, where x is an integer greater than 1, and/or in random access response (RAR). The UE will apply the first time interval for determining the resource for the uplink transmission, where the uplink transmission is at least one of the followings: PUSCH scheduled by RAR UL grant, PUSCH scheduled by a DCI format 0_1 and CRC scrambled by TC-RNTI, PUSCH CRC scrambled by MsgA-RNTI, PUCCH, PRACH. For simplicity, we assume that the K offset is indicated in SIB1 to be 200 ms, and the subcarrier spacing is 15 KHz, then the UE determines the K offset in slot is 200 slots based on Table 1. The K offset is indicated in SIB1 to be 200 ms, and the subcarrier spacing is 30 KHz, then the UE determines the K offset in slot is 400 slots based on Table 1. The K offset is indicated in SIB1 to be 200 ms, and the subcarrier spacing is 60 KHz, then the UE determines the K offset in slot is 800 slots based on Table 1. The K offset is indicated in SIB1 to be 200 ms, and the subcarrier spacing is 120 KHz, then the UE determines the K offset in slot is 1600 slots based on Table 1. The K offset is indicated in SIB1 to be 200 ms, and the subcarrier spacing is 240 KHz, then the UE determines the K offset in slot is 3200 slots based on Table 1. In an embodiment, the network may indicate one or more values of K offset, each of the values may further be associated with one or more BWP or one or more satellite beams. The UE may determine a suitable value among the indicated K offset values that is corresponding to the BWP where the UE intends to perform the random access procedure. In an embodiment, the UE may be informed by the network about which value among the one or more values of K offset is to be used. In an embodiment, the K offset may be indicated by the network to the UE by UE-specific RRC signaling.

In an NTN system, a UE tries to access to a network. The network may indicate a value of a time interval called K offset. The K offset may be used to determine a time domain resource allocation for an uplink transmission. The principle of using K offset is to leave enough time to absorb the signal propagation delay, which is considered to be much longer compared to terrestrial network. In this example, we present a method for a UE determining K offset for a PUSCH transmission scheduled by a RAR UL grant, where the RAR UL grant is transmitted in a PDSCH that is scheduled by a DCI format 1_0 and CRC scrambled by RA-RNTI, or a PUSCH transmission scheduled by a DCI format 0_0 and CRC scrambled by TC-RNTI.

Figure 7:
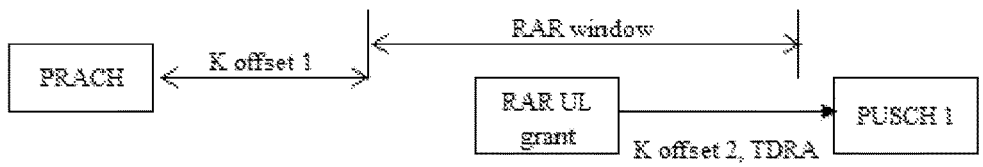
FIG. 7 is a schematic diagram illustrating a method of determining a position of a first window and/or a position of a second transmission after a first transmission using a first parameter such as k offset according to an embodiment of the present disclosure.

FIG. 7 illustrates a method of determining a position of a first window and/or a position of a second transmission after a first transmission using a first parameter such as k offset according to an embodiment of the present disclosure. FIG. 7 illustrates that, in some embodiments, if a UE is an idle UE and wants to access to the network, the UE will read system information to determine a set of RACH occasion. After the UE transmits a PRACH in a picked RACH occasion, the UE will start a RAR window for receiving a RAR message within the RAR window as illustrated in FIG. 7. Here, the starting location of the RAR window is relevant to a first K offset interval (K offset 1). The value of the K offset 1 may be determined from a signaled interval in system information, e.g. SIB1 or SIBx, where x is larger than 1. Then if the idle UE receives a RAR message in the RAR window and reads a RAR UL grant for scheduling a PUSCH transmission (PUSCH1) for message 3 (Msg3), the UE needs to use a K offset 2 and time domain resource allocation (TDRA) information to determine the PUSCH resource, where the TDRA information is indicated in the RAR UL grant and the K offset 2 may be identical to K offset 1. In an embodiment, the K offset 2 may be an updated value determined from the received RAR. In an embodiment, the K offset 2 may be indicated by the network in a system information, where the K offset 1 and the K offset 2 may be in the same system information, e.g. SIB1. In an embodiment, the K offset 1 and the K offset 2 may be in different system information, e.g. the K offset 2 is obtained from SIB9, or the K offset 1 is obtained from SIB1. In an embodiment, the K offset 1 may be determined from the K offset 2, e.g. K offset 1=K offset 2+delta, where the delta is an offset adjustment on the K offset 2. An example is that when the K offset 2=10 slots and the delta=5 slots, the K offset 15 slots. The value of the delta may be indicated by the network in the system information. In an embodiment, the value of the delta may be positive or negative and the unit of the delta may be in second or millisecond or slot.

Figure 8:
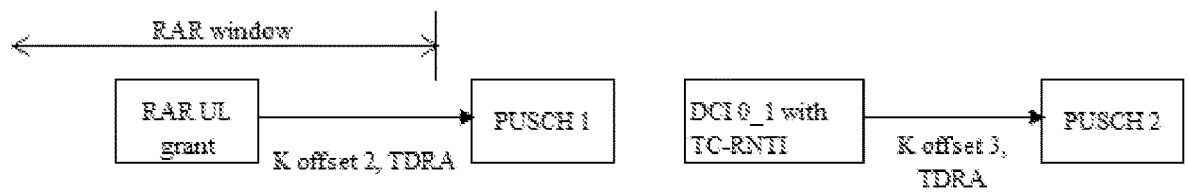
FIG. 8 is a schematic diagram illustrating a method of determining a position of a first window and/or a position of a second transmission after a first transmission using a first parameter such as k offset according to another embodiment of the present disclosure.

FIG. 8 illustrates a method of determining a position of a first window and/or a position of a second transmission after a first transmission using a first parameter such as k offset according to another embodiment of the present disclosure. FIG. 8 illustrates that, in some embodiments, the idle UE may receive a DCI format 0_0 with CRC scrambled by TC-RNTI, and the DCI format 0_0 is used to schedule a PUSCH transmission (PUSCH 2) for Msg3 retransmission as shown in FIG. 8. The UE will use K offset 3 and TDRA information to determine the PUSCH 2 resource. Here the K offset 3 may be identical to the K offset 2 used for PUSCH 1 and the TDRA information is indicated in the DCI 0_0. In an embodiment, the K offset 2 may be an updated K offset value determined from the DCI format 0_0.

In some examples, for a connected UE, e.g. the UE obtains C-RNTI, and assume that the UE obtains a latest K offset value (we call it UE-specific K offset). The K offset value may be obtained by UE-specific RRC signaling, or a MAC-CE, or a group-common DCI format, or a DCI format scrambled with C-RNTI, or CS-RNTI, or MCS-C-RNTI; or the K offset value may be determined by UE its own from its latest timing advance. When the UE performs a contention based RACH procedure, as illustrated in FIG. 7, after transmitting PRACH, the UE uses a K offset 1 to determine a starting location for a RAR window, where the K offset 1 is different from the UE-specific K offset, and the UE may use an time duration that is signaled in a system information, e.g. SIB1 or SIBx, where x is larger than 1, to determine the K offset 1. Then if the UE receives a RAR message in the RAR window and reads a RAR UL grant for scheduling a PUSCH transmission (PUSCH1) for message 3 (Msg3), the UE may use a K offset 2 and/or a time domain resource allocation (TDRA) information to determine the PUSCH resource, where the TDRA information is indicated in the RAR UL grant and the K offset 2 may be identical to K offset 1. In an embodiment, the K offset 2 may be an updated value determined from the received RAR. In an embodiment, the UE may receive a DCI format 0_0 with CRC scrambled by TC-RNTI, and the DCI format 0_0 is used to schedule a PUSCH transmission (PUSCH 2) for Msg3 retransmission as illustrated in FIG. 8. The UE may use a K offset 3 and a TDRA information to determine the PUSCH 2 resource. Here the K offset 3 may be identical to the K offset 2 that is used for PUSCH 1 and the TDRA information is indicated in the DCI 0_0. In an embodiment, the K offset 2 may be an updated K offset value determined from the DCI format 0_0.

In some examples, the network may configure one or more values of K offset in the system information and/or in a UE-specific RRC message. The one or more values of K offset may be associated with one or more BWPs. In an embodiment, the network may configure one or more RACH occasions for the one or more BWPs, and/or the network may configure one or more reference signals that are associated with the one or more BWPs. The one or more configured reference signals may be further associated with one or more beams. The UE may measure these beams by measuring the one or more reference signals, and selects a suitable beam for communication. Thus, the UE may perform a random access procedure in a target BWP to inform the network what the best beam is for the UE. The target BWP may serve as an information indicator from the UE to the network about the UE selected beam. The UE will use the K offset value corresponding to the target BWP. Further the target BWP is corresponding to the configured reference signal that is associated with the beam selected by the UE. This method is suitable for a UE performing beam failure recovery. The reference signals include SSB and/or CSI-RS and/or periodic tracking reference signal and/or aperiodic tracking reference signal.

Figure 9:
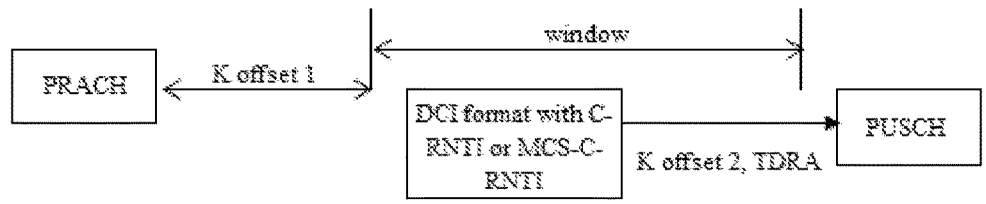
FIG. 9 is a schematic diagram illustrating a method of determining a position of a first window and/or a position of a second transmission after a first transmission using a first parameter such as k offset according to another embodiment of the present disclosure.

FIG. 9 illustrates a method of determining a position of a first window and/or a position of a second transmission after a first transmission using a first parameter such as k offset according to another embodiment of the present disclosure. FIG. 9 illustrates that, in some embodiments, for a connected UE, e.g. the UE obtains C-RNTI, and assume that the UE obtains a latest K offset value (we call it UE-specific K offset). The K offset value may be obtained by UE-specific RRC signaling, or a MAC-CE, or a group-common DCI format, or a DCI format scrambled with C-RNTI, or CS-RNTI, or MCS-C-RNTI; or the K offset value may be determined by UE its own from its latest timing advance. When the UE performs a contention-free based RACH procedure, e.g. PDCCH order, or beam failure recovery request.

As illustrated in FIG. 7, after transmitting PRACH, the UE uses a K offset 1 to determine a starting location for a window for monitoring PDCCH for the detection of a DCI format with CRC scrambled by C-RNTI or MCS-C-RNTI or CS-RNTI, here the K offset 1 may be identical to the UE-specific K offset. When the UE receives a DCI format with CRC scrambled by C-RNTI or MCS-C-RNTI or CS-RNTI and if the DCI format schedules a PUSCH, the PUSCH resource may be determined by a K offset 2 and/or a TDRA information. The TDRA information is indicted in the DCI format, and the K offset 2 may be identical to K offset 1. In an embodiment, the K offset 2 may be an updated value determined from the DCI format.

In some examples, for a connected UE, e.g. the UE obtains C-RNTI, and assume that the UE obtains a latest K offset value (we call it UE-specific K offset). The K offset value may be obtained by UE-specific RRC signaling, or a MAC-CE, or a group-common DCI format, or a DCI format scrambled with C-RNTI, or CS-RNTI, or MCS-C-RNTI; or the K offset value may be determined by UE its own from its latest timing advance. When the UE performs a contention-free based RACH procedure, e.g. PDCCH order, or beam failure recovery request. After transmitting a PRACH, the UE uses a K offset 1 to determine a starting location for a window for monitoring PDCCH for the detection of a DCI format with CRC scrambled by C-RNTI or MCS-C-RNTI or CS-RNTI, here the K offset 1 may be identical to a time duration signaled in an RRC signaling or in a system information, e.g. SIB1 or SIBx, where the time duration may be associated with a beam or a bandwidth part. In an embodiment, the beam is further associated with a reference signal, e.g. SSB or CSI-RS. In an embodiment, the reference signal is associated with the RACH occasion where the PRACH is transmitted. In an embodiment, the bandwidth part comprises a DL bandwidth part. In an embodiment, the DL bandwidth part is associated with the beam. In an embodiment, the DL bandwidth is associated with the RACH occasion, where the PRACH is transmitted.

In some examples, a UE performs a contention-free random access (CFRA). The CFRA may be triggered by a beam failure and/or a link failure, the UE detects a new beam from a set of reference signals, where the UE may assume each reference signal may be associated with a different beam. When the UE selects a new beam, the UE will perform a CFRA in a BWP corresponding to the selected reference signal or the selected new beam. The UE may use a K offset value corresponding to the BWP. The K offset value may be used to determine the position of the first window and/or the first transmission according to embodiments of the present disclosure. The K offset may be signaled in a system information and/or a UE specific RRC message. The UE may transmit a PRACH in a RACH occasion corresponding to the BWP and/or the selected reference signal and/or the selected new beam. The association between K offset and BWP and/or reference signal and/or RACH occasion may be signaled by the network to the UE. In an embodiment, the association may be signaled in a system information and/or in a UE specific RRC message.

In some examples, a UE performs a contention a contention-free random access (CFRA). The UE may continue using a latest K offset value for determining the position of the first window and/or the first transmission according to embodiments of the present disclosure. The latest K offset may be a latest K offset value determined by the UE and/or a latest K offset value signalled by the network in a UE specific RRC message and/or a MAC-CE and/or a DCI. In this example, the CFRA may be triggered by a PDCCH order or higher layer, e.g. for a PRACH transmission triggered by a PDCCH order, the PRACH mask index field according to TS 38.212, if the value of the random access preamble index field is not zero, indicates the PRACH occasion for the PRACH transmission where the PRACH occasions are associated with the SS/PBCH block index indicated by the SS/PBCH block index field of the PDCCH order. In an embodiment, for a PRACH transmission triggered by higher layers, if ssb-ResourceList is provided, the PRACH mask index is indicated by ra-ssb-OccasionMaskIndex which indicates the PRACH occasions for the PRACH transmission where the PRACH occasions are associated with the selected SS/PBCH block index.

In some examples, a UE performs a contention a contention based random access (CBRA) in an active BWP, where the active BWP includes active uplink (UL) BWP and its corresponding active downlink (DL) BWP. When the active UL BWP meets a condition, the UE will use a K offset value corresponding to the active BWP that is signaled in a UE-specific RRC message and/or in a system information. The K offset is used for determining the position of the first window and/or the first transmission according to embodiments of the present disclosure. In an embodiment, when the active UL BWP does not meet a condition, the UE will use a latest K offset corresponding to the active BWP for determining the position of the first window and/or the first transmission according to our embodiments, where the latest K offset may be a latest K offset value determined by the UE and/or a latest K offset value signaled by the network in a UE specific RRC message and/or a MAC-CE and/or a DCI. In an embodiment, the condition may include at least one of the followings: the active UL BWP is the initial UL BWP; the active UL BWP covers all the RB of the initial UL BWP; the active UL BWP has a same subcarrier spacing as the initial UL BWP; or the active UL BWP has a same cyclic prefix length as the initial UL BWP.

In some examples, a UE may receive a PDSCH from a network and the PDSCH carries a MAC-CE. The MAC-CE comprises at least one of the MAC-CEs defined according to section 5.18 of TS 38.321. The UE needs to determine from a reference time that the MAC-CE command should be applied, and some examples call this reference time MAC-CE activation time. In a legacy system, as described in TS 38.214, the UE determines the MAC-CE activation time from a first slot that is after $n+3N_{slot}^{subframe,u}$, where n is a slot in which the UE transmits HARQ-ACK information corresponding to the PDSCH carrying the MAC-CE; u is PUCCH subcarrier spacing and $N_{slot}^{subframe,u}$, is a number of slots equivalent to 3 ms and n. In an NTN system, a gNB downlink and uplink timing may not be aligned due to the fact that the UE may not be able to compensate a full round trip time, in particular for a feeder link. Therefore, the network may indicate an offset, e.g. K offset 4. The UE determines the MAC-CE activation time from the first slot that is after $n'+offset+3+N_{slot}^{subframe,u}$, where n' is a slot where a PUCCH resource is allocated for HARQ-ACK transmission for the PDSCH and the n' is determined in UE downlink timing; the offset is a number of slots and a slot duration is based on a PUCCH subcarrier spacing. In an embodiment, the slot duration is based on a reference subcarrier spacing, where the reference subcarrier spacing may be pre-defined or configured. In an embodiment, the offset is indicated in the MAC-CE, e.g. the MAC-CE format comprises a field to indicate a value of the offset. In an embodiment, the offset value comprises zero. In an embodiment, a MAC-CE format may or may not comprises the field to indicate the offset according to whether the MAC-CE concerns on UE reception or UE transmission, wherein the MAC-CE concerning UE reception comprises at least one of the followings: activation/deactivation of a semi-persistent CSI-RS/CSI-IM resource set; an aperiodic CSI trigger state sub-selection; activation/deactivation of a UE-specific PDSCH TCI state; an indication of a TCI state of UE-specific PDCCH; or activation/deactivation of a semi-persistent ZP CSI-RS resource set. The MAC-CE concerning UE transmission comprises at least one of the followings: activation/deactivation of a semi-persistent SRS; or activation/deactivation of a spatial relation of a PUCCH resource.

Figure 10:
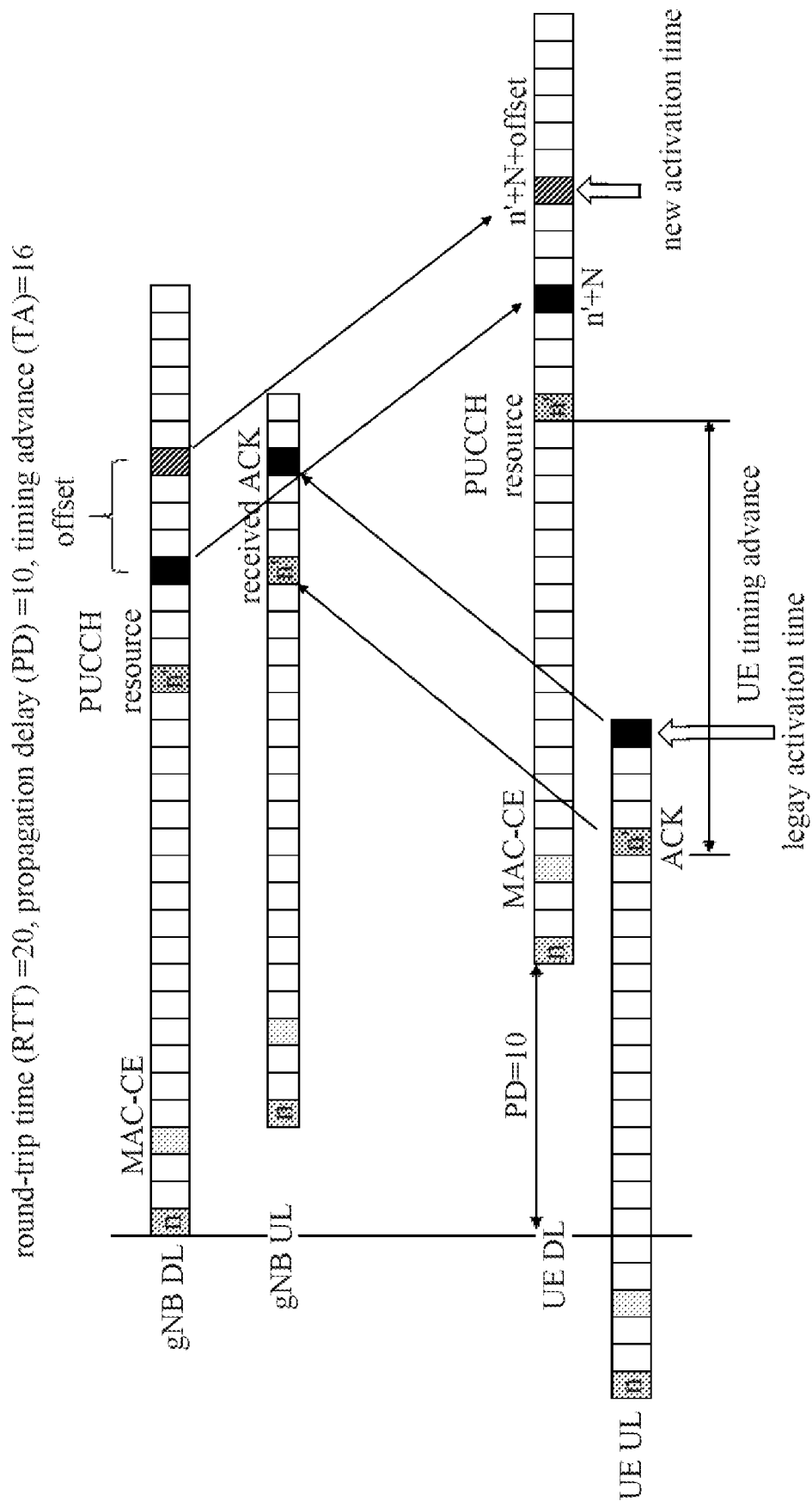
FIG. 10 is a schematic diagram illustrating an information transmission method where a gNB downlink timing and a gNB uplink timing are not aligned, and on a UE side, downlink timing and uplink timing are shifted by a timing advance.

An example is illustrated in FIG. 10, where a gNB downlink timing and a gNB uplink timing are not aligned. On a UE side, downlink timing and uplink timing are shifted by a timing advance. When the UE receives a PDSCH carrying a MAC-CE command, the UE will determine MAC-CE activation time starts from a first slot that is after n'+N+offset, where n' is a slot where the PUCCH resource is allocated for HARQ-ACK transmission for the PDSCH at the UE downlink timing and $N=3N_{slot}^{subframe,u}$, and the offset is an indicated offset value. The activation time is derived in the UE downlink timing. In an embodiment, the UE can also derive the MAC-CE activation time in UE uplink timing, e.g. the activation time is the first slot that is after n'+N+offset+timing advance, where n' is now the slot in which UE transmits HARQ-ACK information for the PDSCH at the UE uplink timing. In some examples, the offset can comprise the timing advance, e.g. n'+N+offset 2, where offset 2=offset+timing advance. Thus, the network can directly indicate offset 2. In an embodiment, the offset is used for determining the MAC-CE activation time when the MAC-CE is concerning UE reception. In an embodiment, the offset is not used for determining the MAC-CE activation time when the MAC-CE is concerning UE reception. In an embodiment, the offset is used for determining the MAC-CE activation time when the MAC-CE is concerning UE transmission. In an embodiment, the offset is not used for determining the MAC-CE activation time when the MAC-CE is concerning UE transmission.

Commercial interests for some embodiments are as follows. 1. Solving issues in the prior art. 2. Adapting a suitable offset value and/or duration for the subsequent transmission. 3. Providing a good communication performance. 4. Providing a high reliability. 5. Some embodiments of the present disclosure are used by 5G-NR chipset vendors, vehicle to everything (V2X) communication system development vendors, automakers including cars, trains, trucks, buses, bicycles, moto-bikes, helmets, and etc., drones (unmanned aerial vehicles), smartphone makers, communication devices for public safety use, augmented reality (AR)/virtual reality (VR) device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 11:
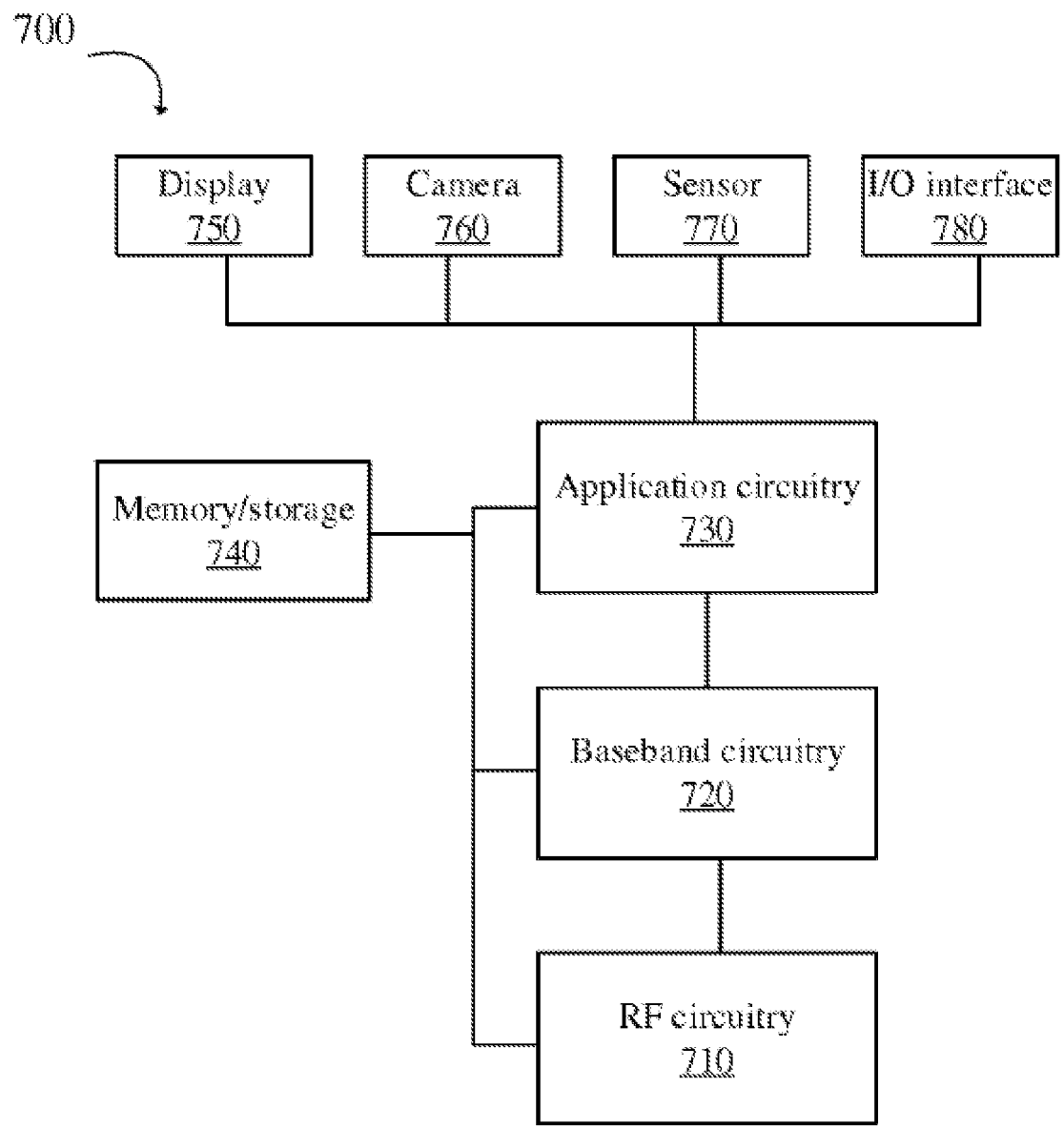
FIG. 11 is a block diagram of a system for wireless communication according to an embodiment of the present disclosure.

FIG. 11 is a block diagram of an example system 700 for wireless communication according to an embodiment of the present disclosure. Embodiments described herein may be implemented into the system using any suitably configured hardware and/or software. FIG. 11 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. An information transmission method, comprising:
   determining, by a user equipment (UE), at least one of a first time duration and a second time duration; and
   determining, by the UE, at least one of a first position using the first time duration and a second position using the second time duration for a random access procedure, wherein the first position comprises a position of a first window and the second position comprises a position of a first transmission;
   wherein the random access procedure comprises at least one of the followings: a type 1 random access procedure, or a type 2 random access procedure;
   wherein the type 1 random access procedure comprises a 4-step resource allocation (RA) type;
   wherein the type 2 random access procedure comprises a 2-step RA type;
   wherein the 4-step RA type comprises the UE transmitting a message 1 (Msg1) on a physical random access channel (PRACH) transmission, wherein the Msg1 comprises a preamble;
   wherein the 2-step RA type comprises the UE transmitting a message A (MsgA) on the PRACH transmission and a first physical uplink shared channel (PUSCH) transmission wherein the Msg A comprises a preamble and a payload;
   wherein the preamble is transmitted in the PRACH transmission;
   wherein the payload is transmitted in the first PUSCH transmission;
   wherein the first PUSCH is associated with the PRACH transmission.

2. The method of claim 1, wherein the random access procedure comprises a contention-based random access procedure (CBRA) and/or a contention-free random access procedure (CFRA);
   wherein the CFRA comprises a preamble assigned by a base station and/or a resource of the first PUSCH assigned by the base station.

3. The method of claim 1, wherein the first window comprises at least one of a random access response (RAR) window and a contention resolution window;
   wherein the RAR window comprises a window for receiving at least one of a RAR to the Msg 1 and a RAR to the MsgA, by the UE, from the base station;
   wherein the RAR is transmitted in a first physical downlink shared channel (PDSCH) or in a first physical downlink control channel (PDCCH), wherein the first PDSCH is scheduled by a first downlink control information (DCI) format with cyclical redundancy check (CRC) scrambled by random access-radio network temporary identity (RA-RNTI) or MsgA-radio network temporary identity (MsgA-RNTI);
   wherein the first DCI format comprises DCI format 1_0;
   wherein the contention resolution window comprises a timer;
   wherein the UE may receive a second PDSCH within the contention resolution window, wherein the second PDSCH may be in response to at least one of the first PUSCH and a second PUSCH;
   wherein the second PUSCH may be scheduled by at least one of a RAR uplink grant and a second DCI format with CRC scrambled by temporary cell-radio network temporary identity (RNTI) (TC-RNTI);
   wherein the second PUSCH comprises a message 3 (Msg3);
   wherein the RAR uplink grant may be transmitted in the first PDSCH;
   wherein the second DCI format comprises DCI format 0_0;
   wherein at least one of the first DCI format and the second DCI format may be detected in a second PDCCH according to a type 1 PDCCH common search space (CSS) set;
   wherein the second PDSCH comprises a UE contention resolution identity;
   wherein the first PDCCH comprises a third DCI format with CRC scrambled by cell-radio network temporary identity (C-RNTI) or modulation coding scheme (MCS)-cell-RNTI (MCS-C-RNTI);
   wherein the first PDCCH is detected in a configured search space set;
   wherein the configured search space set is configured by recoverySearchSpaceId.

4. The method of claim 1, wherein determining at least one of the first time duration and the second time duration is further relevant to at least one of the CFRA, the CBRA, the 2-step RA type, the 4-step RA type and an active BWP;
   wherein the UE determines at least one of the first time duration and the second time according to whether the random process procedure is the CFRA or the CBRA;
   wherein the UE determines at least one of the first time duration and the second time according to whether the random process procedure is the 2-step RA type or the 4-step RA type;
   wherein the UE determines at least one of the first time duration and the second time according to a relationship between an active bandwidth part (BWP) and an initial uplink (UL) BWP;
   wherein the active BWP comprises an active UL BWP in which the UE transmits the PRACH transmission for the random access procedure;
   wherein when the random access procedure is at least one of the followings: the CFRA, the CBRA, the 2-step RA type, or the 4-step RA type, the UE may determine at least one of the first time duration and the second time duration from the system information by the first parameter;
   wherein when the active BWP satisfies at least one of the following conditions:
      the active BWP includes all the resource blocks (RBs) of the initial UL BWP; or
      the active BWP has the same subcarrier spacing as the initial UL BWP; or the active BWP has the same cyclic prefix (CP) length as the initial UL BWP;

the UE may determine at least one of the first time duration and the second time duration from the system information by the first parameter.

5. An information transmission method, comprising:
configuring, by a base station, at least one of a first time duration and a second time duration to a user equipment (UE); and
controlling, by the base station, the UE to determine at least one of a first position using the first time duration and a second position using the second time duration for a random access procedure, wherein the first position comprises a position of a first window and the second position comprises a position of a first transmission;
wherein the random access procedure comprises at least one of the followings: a type 1 random access procedure, or a type 2 random access procedure;
wherein the type 1 random access procedure comprises a 4-step resource allocation (RA) type;
wherein the type 2 random access procedure comprises a 2-step RA type;
wherein the 4-step RA type comprises the UE transmitting a message 1 (Msg1) on a physical random access channel (PRACH) transmission, wherein the Msg1 comprises a preamble;
wherein the 2-step RA type comprises the UE transmitting a message A (MsgA) on the PRACH transmission and a first physical uplink shared channel (PUSCH) transmission, wherein the Msg A comprises a preamble and a payload;
wherein the preamble is transmitted in the PRACH transmission;
wherein the payload is transmitted in the first PUSCH transmission;
wherein the first PUSCH is associated with the PRACH transmission.

6. The method of claim 5, wherein the random access procedure comprises a contention-based random access procedure (CBRA) and/or a contention-free random access procedure (CFRA);
wherein the CFRA comprises a preamble assigned by a base station and/or a resource of the first PUSCH assigned by the base station.

7. The method of claim 5, wherein the first window comprises at least one of a random access response (RAR) window and a contention resolution window;
wherein the RAR window comprises a window for receiving at least one of a RAR to the Msg 1 and a RAR to the MsgA, by the UE, from the base station;
wherein the RAR is transmitted in a first physical downlink shared channel (PDSCH) or in a first physical downlink control channel (PDCCH), wherein the first PDSCH is scheduled by a first downlink control information (DCI) format with cyclical redundancy check (CRC) scrambled by random access-radio network temporary identity (RA-RNTI) or MsgA-radio network temporary identity (MsgA-RNTI);
wherein the first DCI format comprises DCI format 1_0;
wherein the contention resolution window comprises a timer;
wherein the UE may receive a second PDSCH within the contention resolution window, wherein the second PDSCH may be in response to at least one of the first PUSCH and a second PUSCH;
wherein the second PUSCH may be scheduled by at least one of a RAR uplink grant and a second DCI format with CRC scrambled by temporary cell-radio network temporary identity (RNTI) (TC-RNTI);
wherein the second PUSCH comprises a message 3 (Msg3);
wherein the RAR uplink grant may be transmitted in the first PDSCH;
wherein the second DCI format comprises DCI format 0_0;
wherein at least one of the first DCI format and the second DCI format may be detected in a second PDCCH according to a type 1 PDCCH common search space (CSS) set;
wherein the second PDSCH comprises a UE contention resolution identity;
wherein the first PDCCH comprises a third DCI format with CRC scrambled by cell-radio network temporary identity (C-RNTI) or modulation coding scheme (MCS)-cell-RNTI (MCS-C-RNTI);
wherein the first PDCCH is detected in a configured search space set;
wherein the configured search space set is configured by recoverySearchSpaceId.

8. The method of claim 5, wherein determining at least one of the first time duration and the second time duration is further relevant to at least one of the CFRA, the CBRA, the 2-step RA type, the 4-step RA type and an active BWP;
wherein the UE determines at least one of the first time duration and the second time according to whether the random process procedure is the CFRA or the CBRA;
wherein the UE determines at least one of the first time duration and the second time according to whether the random process procedure is the 2-step RA type or the 4-step RA type;
wherein the UE determines at least one of the first time duration and the second time according to a relationship between an active bandwidth part (BWP) and an initial uplink (UL) BWP;
wherein the active BWP comprises an active UL BWP in which the UE transmits the PRACH transmission for the random access procedure;
wherein when the random access procedure is at least one of the followings: the CFRA, the CBRA, the 2-step RA type, or the 4-step RA type, the UE may determine at least one of the first time duration and the second time duration from the system information by the first parameter;
wherein when the active BWP satisfies at least one of the following conditions:
the active BWP includes all the resource blocks (RBs) of the initial UL BWP; or
the active BWP has the same subcarrier spacing as the initial UL BWP; or
the active BWP has the same cyclic prefix (CP) length as the initial UL BWP;
the UE may determine at least one of the first time duration and the second time duration from the system information by the first parameter.

9. A user equipment (UE) of processing a radio resource control (RRC) procedure delay, comprising:
a memory;
a transceiver; and
a processor coupled to the memory and the transceiver;
wherein the processor is configured to:
determine at least one of a first time duration and a second time duration; and determine at least one of a first position using the first time duration and a second position using the second time duration for a random access procedure, wherein the first position comprises a position of a first window and the second position comprises a position of a first transmission;

wherein the random access procedure comprises at least one of the followings: a type 1 random access procedure, or a type 2 random access procedure;

wherein the type 1 random access procedure comprises a 4-step resource allocation (RA) type;

wherein the type 2 random access procedure comprises a 2-step RA type;

wherein the 4-step RA type comprises the UE transmitting a message 1 (Msg1) on a physical random access channel (PRACH) transmission, wherein the Msg1 comprises a preamble;

wherein the 2-step RA type comprises the UE transmitting a message A (MsgA) on the PRACH transmission and a first physical uplink shared channel (PUSCH) transmission wherein the Msg A comprises a preamble and a payload;

wherein the preamble is transmitted in the PRACH transmission;

wherein the payload is transmitted in the first PUSCH transmission;

wherein the first PUSCH is associated with the PRACH transmission.

10. The UE of claim 9, wherein the random access procedure comprises a contention-based random access procedure (CBRA) and/or a contention-free random access procedure (CFRA);

wherein the CFRA comprises a preamble assigned by a base station and/or a resource of the first PUSCH assigned by the base station.

11. The UE of claim 9, wherein the first window comprises at least one of a random access response (RAR) window and a contention resolution window;

wherein the RAR window comprises a window for receiving at least one of a RAR to the Msg 1 and a RAR to the MsgA, by the UE, from the base station;

wherein the RAR is transmitted in a first physical downlink shared channel (PDSCH) or in a first physical downlink control channel (PDCCH), wherein the first PDSCH is scheduled by a first downlink control information (DCI) format with cyclical redundancy check (CRC) scrambled by random access-radio network temporary identity (RA-RNTI) or MsgA-radio network temporary identity (MsgA-RNTI);

wherein the first DCI format comprises DCI format 1_0;

wherein the contention resolution window comprises a timer;

wherein the UE may receive a second PDSCH within the contention resolution window, wherein the second PDSCH may be in response to at least one of the first PUSCH and a second PUSCH;

wherein the second PUSCH may be scheduled by at least one of a RAR uplink grant and a second DCI format with CRC scrambled by temporary cell-radio network temporary identity (RNTI) (TC-RNTI);

wherein the second PUSCH comprises a message 3 (Msg3);

wherein the RAR uplink grant may be transmitted in the first PDSCH;

wherein the second DCI format comprises DCI format 0_0;

wherein at least one of the first DCI format and the second DCI format may be detected in a second PDCCH according to a type 1 PDCCH common search space (CSS) set;

wherein the second PDSCH comprises a UE contention resolution identity;

wherein the first PDCCH comprises a third DCI format with CRC scrambled by cell-radio network temporary identity (C-RNTI) or modulation coding scheme (MCS)-cell-RNTI (MCS-C-RNTI);

wherein the first PDCCH is detected in a configured search space set;

wherein the configured search space set is configured by recoverySearchSpaceId.

12. The UE of claim 1, wherein determining at least one of the first time duration and the second time duration is further relevant to at least one of the CFRA, the CBRA, the 2-step RA type, the 4-step RA type and an active BWP;

wherein the UE determines at least one of the first time duration and the second time according to whether the random process procedure is the CFRA or the CBRA;

wherein the UE determines at least one of the first time duration and the second time according to whether the random process procedure is the 2-step RA type or the 4-step RA type;

wherein the UE determines at least one of the first time duration and the second time according to a relationship between an active bandwidth part (BWP) and an initial uplink (UL) BWP;

wherein the active BWP comprises an active UL BWP in which the UE transmits the PRACH transmission for the random access procedure;

wherein when the random access procedure is at least one of the followings: the CFRA, the CBRA, the 2-step RA type, or the 4-step RA type, the UE may determine at least one of the first time duration and the second time duration from the system information by the first parameter;

wherein when the active BWP satisfies at least one of the following conditions:
 the active BWP includes all the resource blocks (RBs) of the initial UL BWP; or
 the active BWP has the same subcarrier spacing as the initial UL BWP; or
 the active BWP has the same cyclic prefix (CP) length as the initial UL BWP;
the UE may determine at least one of the first time duration and the second time duration from the system information by the first parameter.

13. A base station of processing a radio resource control (RRC) procedure delay, comprising:
 a memory;
 a transceiver; and
 a processor coupled to the memory and the transceiver;
wherein the processor is configured to:
 configure at least one of a first time duration and a second time duration to a user equipment (UE); and
 control the UE to determine at least one of a first position using the first time duration and a second position using the second time duration for a random access procedure, wherein the first position comprises a position of a first window and the second position comprises a position of a first transmission;
 wherein the random access procedure comprises at least one of the followings: a type 1 random access procedure, or a type 2 random access procedure;

wherein the type 1 random access procedure comprises a 4-step resource allocation (RA) type;

wherein the type 2 random access procedure comprises a 2-step RA type;

wherein the 4-step RA type comprises the UE transmitting a message 1 (Msg1) on a physical random access channel (PRACH) transmission, wherein the Msg1 comprises a preamble;

wherein the 2-step RA type comprises the UE transmitting a message A (MsgA) on the PRACH transmission and a first physical uplink shared channel (PUSCH) transmission, wherein the Msg A comprises a preamble and a payload;

wherein the preamble is transmitted in the PRACH transmission;

wherein the payload is transmitted in the first PUSCH transmission;

wherein the first PUSCH is associated with the PRACH transmission.

14. The base station of claim 13, wherein the random access procedure comprises a contention-based random access procedure (CBRA) and/or a contention-free random access procedure (CFRA);

wherein the CFRA comprises a preamble assigned by a base station and/or a resource of the first PUSCH assigned by the base station.

15. The base station of claim 13, wherein the first window comprises at least one of a random access response (RAR) window and a contention resolution window;

wherein the RAR window comprises a window for receiving at least one of a RAR to the Msg 1 and a RAR to the MsgA, by the UE, from the base station;

wherein the RAR is transmitted in a first physical downlink shared channel (PDSCH) or in a first physical downlink control channel (PDCCH), wherein the first PDSCH is scheduled by a first downlink control information (DCI) format with cyclical redundancy check (CRC) scrambled by random access-radio network temporary identity (RA-RNTI) or MsgA-radio network temporary identity (MsgA-RNTI);

wherein the first DCI format comprises DCI format 1_0;

wherein the contention resolution window comprises a timer;

wherein the UE may receive a second PDSCH within the contention resolution window, wherein the second PDSCH may be in response to at least one of the first PUSCH and a second PUSCH;

wherein the second PUSCH may be scheduled by at least one of a RAR uplink grant and a second DCI format with CRC scrambled by temporary cell-radio network temporary identity (RNTI) (TC-RNTI);

wherein the second PUSCH comprises a message 3 (Msg3);

wherein the RAR uplink grant may be transmitted in the first PDSCH;

wherein the second DCI format comprises DCI format 0_0;

wherein at least one of the first DCI format and the second DCI format may be detected in a second PDCCH according to a type 1 PDCCH common search space (CSS) set;

wherein the second PDSCH comprises a UE contention resolution identity;

wherein the first PDCCH comprises a third DCI format with CRC scrambled by cell-radio network temporary identity (C-RNTI) or modulation coding scheme (MCS)-cell-RNTI (MCS-C-RNTI);

wherein the first PDCCH is detected in a configured search space set;

wherein the configured search space set is configured by recoverySearchSpaceId.

16. The base station of claim 13, wherein determining at least one of the first time duration and the second time duration is further relevant to at least one of the CFRA, the CBRA, the 2-step RA type, the 4-step RA type and an active BWP;

wherein the UE determines at least one of the first time duration and the second time according to whether the random process procedure is the CFRA or the CBRA;

wherein the UE determines at least one of the first time duration and the second time according to whether the random process procedure is the 2-step RA type or the 4-step RA type;

wherein the UE determines at least one of the first time duration and the second time according to a relationship between an active bandwidth part (BWP) and an initial uplink (UL) BWP;

wherein the active BWP comprises an active UL BWP in which the UE transmits the PRACH transmission for the random access procedure;

wherein when the random access procedure is at least one of the followings: the CFRA, the CBRA, the 2-step RA type, or the 4-step RA type, the UE may determine at least one of the first time duration and the second time duration from the system information by the first parameter;

wherein when the active BWP satisfies at least one of the following conditions:
the active BWP includes all the resource blocks (RBs) of the initial UL BWP; or
the active BWP has the same subcarrier spacing as the initial UL BWP; or
the active BWP has the same cyclic prefix (CP) length as the initial UL BWP;

the UE may determine at least one of the first time duration and the second time duration from the system information by the first parameter.

* * * * *